US012783201B2

(12) United States Patent
Kim

(10) Patent No.: US 12,783,201 B2
(45) Date of Patent: Nov. 3, 2026

(54) DISPLAY APPARATUS AND METHOD FOR CONTROLLING THEREOF

(71) Applicant: SAMSUNG ELECTRONICS CO., LTD., Suwon-si (KR)

(72) Inventor: Sangwon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/186,143

(22) Filed: Apr. 22, 2025

(65) Prior Publication Data

US 2025/0251896 A1 Aug. 7, 2025

Related U.S. Application Data

(63) Continuation of application No. 17/688,254, filed on Mar. 7, 2022, now Pat. No. 12,314,623, which is a (Continued)

(30) Foreign Application Priority Data

Jul. 2, 2018 (KR) ........................ 10-2018-0076571

(51) Int. Cl.
*G06F 3/14* (2006.01)
*G06F 1/16* (2006.01)

(52) U.S. Cl.
CPC .......... *G06F 3/1446* (2013.01); *G06F 1/1601* (2013.01)

(58) Field of Classification Search
CPC .... G06F 3/1446; G06F 1/1601; G06F 3/1423; G06F 3/147; G09G 2300/026;
(Continued)

(56) References Cited

U.S. PATENT DOCUMENTS

| | | | |
|---|---|---|---|
| 9,696,959 | B2 | 7/2017 | Fu |
| 10,152,292 | B2 | 12/2018 | Yang |

(Continued)

FOREIGN PATENT DOCUMENTS

| | | |
|---|---|---|
| CN | 205451036 U | 8/2016 |
| CN | 105975236 A | 9/2016 |

(Continued)

OTHER PUBLICATIONS

Communication dated Dec. 26, 2022, issued by the China National Intellectual Property Administration in counterpart Chinese Application No. 201910583885.5.

(Continued)

*Primary Examiner* — Nitin Patel
*Assistant Examiner* — Gloryvid Figueroa-Gibson
(74) *Attorney, Agent, or Firm* — Sughrue Mion, PLLC

(57) ABSTRACT

A display apparatus includes a plurality of cabinets configured to be arranged to form a screen of the display apparatus, each cabinet of the plurality of cabinets including at least one display module, the plurality of cabinets disposed to be adjacent to one another to form a screen of the display apparatus, a plurality of wireless communicators provided in each cabinet of the plurality of cabinets, and a processor configured to, based on a first cabinet among the plurality of cabinets receiving a signal from at least one adjacent cabinet that is adjacent to the first cabinet via at least one wireless communicator provided in the first cabinet, transmit the signal to adjacent cabinets that are adjacent to the first cabinet via a plurality of wireless communicators provided in the first cabinet, and based on the plurality of cabinets receiving the signal according to the transmission, control a display module of each cabinet of the plurality of cabinets to display an image corresponding to each cabinet through each cabinet based on the signal.

20 Claims, 14 Drawing Sheets

Related U.S. Application Data continuation of application No. 16/458,667, filed on Jul. 1, 2019, now Pat. No. 11,269,578.

(58) Field of Classification Search
CPC ........... G09G 2330/08; G09G 2356/00; G09G 2370/16; H04N 21/43637
See application file for complete search history.

(56) References Cited

U.S. PATENT DOCUMENTS

| | | | | |
|---|---|---|---|---|
| 10,540,134 | B2 | 1/2020 | Lee et al. | |
| 11,074,026 | B2 | 7/2021 | Yang | |
| 2005/0093768 | A1 | 5/2005 | Devos et al. | |
| 2009/0287832 | A1 | 11/2009 | Liang | |
| 2012/0319926 | A1 | 12/2012 | Koebrich | |
| 2015/0268918 | A1 | 9/2015 | Fu | |
| 2015/0310591 | A1 | 10/2015 | Takahashi | |
| 2015/0324164 | A1 | 11/2015 | Kim | |
| 2016/0034242 | A1 | 2/2016 | Cho et al. | |
| 2016/0104455 | A1* | 4/2016 | Chiu | G09G 5/12 345/1.3 |
| 2016/0253930 | A1 | 9/2016 | Lee | |
| 2017/0192732 | A1 | 7/2017 | Yang | |
| 2017/0192733 | A1* | 7/2017 | Huang | G06F 3/1431 |
| 2017/0329568 | A1 | 11/2017 | Jo | |
| 2018/0136894 | A1 | 5/2018 | Lee et al. | |
| 2019/0087146 | A1 | 3/2019 | Yang | |
| 2019/0296579 | A1 | 9/2019 | Akatsuka | |

FOREIGN PATENT DOCUMENTS

| | | | |
|---|---|---|---|
| CN | 107018290 | A | 8/2017 |
| KR | 10-0876963 | B1 | 1/2009 |
| KR | 10-2013-0056999 | A | 5/2013 |
| KR | 10-2015-0047325 | A | 5/2015 |
| KR | 10-2016-0016523 | A | 2/2016 |
| KR | 10-2017-0081416 | A | 7/2017 |
| KR | 10-2018-0055322 | A | 5/2018 |
| TW | 201537554 | A | 10/2015 |
| WO | 2017/054886 | A1 | 4/2017 |

OTHER PUBLICATIONS

Communication dated Mar. 9, 2023, issued by the European Patent Office in counterpart European Application No. 22 196 659.1.
Notice of Allowance dated Aug. 22, 2023, issued by Korean Patent Office in Korean Patent Application No. 10-2018-0076571.
Communication issued Oct. 8, 2024 by the European Patent Office in European Patent Application No. 22196659.1.
Communication dated Jun. 28, 2024, issued by the Korean Patent Office in Korean Application No. 10-2023-0163006.
Office Action dated Oct. 28, 2023, issued by Chinese Patent Office in Chinese Patent Application No. 201910583885.5.
Communication dated Nov. 5, 2021 issued by the European Intellectual Property Office in counterpart European Application No. 19 182 234.5.
Rejection Decision dated Jan. 17, 2024, issued by the Chinese Patent Office in Chinese Patent Application No. 201910583885.5.
Communication dated Nov. 21, 2022, issued by the Korean Intellectual Property Office in Korean Patent Application No. 10-2018-0076571.
Communication issued Nov. 29, 2019 by the European Patent Office in counterpart European Patent Application No. 19182234.5.
Communication dated Feb. 15, 2023, issued by the European Patent Office in counterpart European Application No. 19 1822 34.5.
Rejection Decision issued Feb. 24, 2025 by the Korean Patent Office for Korean Patent Application No. 10-2023-0163006.
Communication dated Mar. 5, 2026, issued by the European Patent Office in European Application No. 22196659.1.

* cited by examiner

FIG. 10

| Hall Sensor Flag | DC Flag | Tx/Rx | REMARK |
|---|---|---|---|
| 1,2 | No problem | 2/- | FIRST ROW LEFT SIDE CORNER |
| 1,2,4 | No problem | 2/4 | FIRST ROW HORIZONTAL DIRECTION |
| 1,4 | No problem | 1/2 | FIRST ROW RIGHT SIDE CORNER |
| 1,3,4 | 3 or 4 | 4/3 or 1/4 | ACTIVATE Tx CORRESPODING TO Rx AT WHICH DC INPUT IS RECEIVED |
| 1,2,3,4 | 2 or 4 | 4/2 or 2/4 | ACTIVATE Tx CORRESPODING TO Rx AT WHICH DC INPUT IS RECEIVED |
| 1,2,3 | 2 or 3 | 1/2 or 2/3 | ACTIVATE Tx CORRESPODING TO Rx AT WHICH DC INPUT IS RECEIVED |
| 2,3 | No problem | 3/2 | LAST ROW LEFT SIDE CORNER |
| 2,3,4 | No problem | 4/2 | LAST ROW HORIZONTAL DIRECTION |
| 3,4 | No problem | -/4 | LAST ROW RIGHT SIDE CORDER |

DISPLAY APPARATUS AND METHOD FOR CONTROLLING THEREOF

CROSS-REFERENCE TO RELATED APPLICATION(S)

This application is a Continuation Application of U.S. application Ser. No. 17/688,254, filed on Mar. 7, 2022, which is a continuation of U.S. application Ser. No. 16/458,667, filed on Jul. 1, 2019, which issued as U.S. Pat. No. 11,269,578, which is based on and claims priority from Korean Patent Application No. 10-2018-0076571, filed on Jul. 2, 2018, in the Korean Intellectual Property Office, the disclosures of which are incorporated by reference herein in their entirety.

BACKGROUND

1. Field

The disclosure relates to a display apparatus and a controlling method thereof, and more particularly, to a display apparatus for performing wireless communication and a controlling method thereof.

2. Description of Related Art

With advances in electronic technology, various types of electronic apparatuses that live up to user's needs have been developed. Particularly, the development on a modular display apparatus with a plurality of display apparatuses combined to display an image as a single screen has been ongoing.

In the case of a modular display apparatus in the related art, a plurality of display apparatuses are connected to one another through wired cables.

For example, in the case of a modular display apparatus in which first to fourth display apparatuses are combined in a 2×2 arrangement, the first and second display apparatuses, the second and third display apparatuses, and third and fourth display apparatuses are connected to each other through wired cables, and the modular display apparatus provides an image by sequentially transmitting image signals received through an external device to the display apparatuses connected through wired cables.

However, when a plurality of display apparatuses are connected through wired cables, if a signal transmission error occurs in any one wired cable, the display apparatus connected to the wired cable, and the other display apparatus connected thereto cannot provide an image.

SUMMARY

Provided is a modular display apparatus that provides an image through an entire screen even if a signal transmission error occurs in any one display apparatus.

In accordance with an aspect of the disclosure, there is provided a display apparatus including a plurality of cabinets configured to be arranged to form a screen of the display apparatus, each cabinet of the plurality of cabinets including at least one display module; a plurality of wireless communicators provided in each cabinet of the plurality of cabinets; and a processor configured to: based on a first cabinet of the plurality of cabinets receiving a signal from at least one adjacent cabinet that is adjacent to the first cabinet via at least one wireless communicator provided in the first cabinet, transmit the signal to adjacent cabinets that are adjacent to the first cabinet via a plurality of wireless communicators provided in the first cabinet, and based on the plurality of cabinets receiving the signal according to the transmission, control a display module of each cabinet of the plurality of cabinets to display an image corresponding to each cabinet through each cabinet based on the signal.

The processor may be further configured to, based on one cabinet of the plurality of cabinets receiving the signal from an external device, transmit the signal to adjacent cabinets that are adjacent to the one cabinet via a plurality of wireless communicators provided in the one cabinet.

The processor may be further configured to: divide an image frame included in the signal into a plurality of image frames based on identification information of each cabinet, and control each cabinet to display each divided image frame among the plurality of divided image frames.

The processor may be further configured to: based on one cabinet of the plurality of cabinets being supplied with power from an adjacent cabinet that is adjacent to the one cabinet, identify a cabinet to which power is supplied from among adjacent cabinets that are adjacent to the one cabinet based on a sensing result of a sensor provided in the one cabinet, and control the one cabinet to supply the power to the identified cabinet.

The processor may be further configured to: based on a second cabinet of the plurality of cabinets being supplied with power from an external source, identify a cabinet to which power is supplied from among adjacent cabinets that are adjacent to the second cabinet based on a sensing result of a sensor provided in the second cabinet, and control the second cabinet to supply the power to the identified cabinet.

The processor may be further configured to: set identification information of the second cabinet being supplied with power from the external source to a first value; and set identification information of the plurality of cabinets by sequentially increasing identification values in an order from the second cabinet to the cabinet to which power is supplied.

The processor may be further configured to, based on the signal being received at the first cabinet via the plurality of wireless communicators provided in the first cabinet, control the display module to display the image based on a signal received via a wireless communicator located in a first direction according to a predetermined priority.

The processor may be further configured to, based on identification that the signal is not received via the wireless communicator located in the first direction, control the display module to display the image based on a signal received via a wireless communicator located in a second direction according to the predetermined priority.

The processor may be further configured to: generate information related to a transmission error of the wireless communicator located in the first direction, and control the display to display the generated information through at least one cabinet.

The plurality of wireless communicators may be provided at positions where the plurality of cabinets are coupled to one another.

In accordance with an aspect of the disclosure, there is provided a method for controlling a display apparatus comprising a plurality of cabinets configured to be arranged to form a screen of the display apparatus, the method including: receiving a signal at a first cabinet of the plurality of cabinets from at least one adjacent cabinet that is adjacent to the first cabinet via at least one wireless communicator provided in the first cabinet; transmitting the signal to adjacent cabinets that are adjacent to the first cabinet via a plurality of wireless communicators provided in the first cabinet; and based on the plurality of cabinets receiving the signal according to the transmission, displaying an image corresponding to each cabinet of the plurality of cabinets through each cabinet based on the signal.

The transmitting may include, based on one cabinet of the plurality of cabinets receiving the signal from an external device, transmitting the signal to adjacent cabinets that are adjacent to the one cabinet via a plurality of wireless communicators provided in the one cabinet.

The displaying may include dividing an image frame included in the signal into a plurality of image frames based on identification information on each cabinet, and displaying each divided image frame of the plurality of divided image frames.

The method may include based on one cabinet of the plurality of cabinets being supplied with power from an adjacent cabinet that is adjacent to the one cabinet, identifying a cabinet to which power is supplied from among adjacent cabinets that are adjacent to the one cabinet based on a sensing result of a sensor provided in the one cabinet, and controlling the one cabinet to supply the power to the identified cabinet.

The method may include based on a second cabinet of the plurality of cabinets being supplied with power from an external source, identifying a cabinet to which power is supplied from among a plurality of adjacent cabinets that are adjacent to the second cabinet based on a sensing result of a sensor provided in the second cabinet, and controlling the second cabinet to supply the power to the identified cabinet.

The method may include based on setting identification information on the second cabinet being supplied with power from the external source to a first value; and setting identification information on the plurality of cabinets by sequentially increasing identification values in an order from the second cabinet to the cabinet to which power is supplied.

The displaying may include, based on the signal being received at the first cabinet via a plurality of wireless communicators provided in the first cabinet, displaying the image based on a signal received via a wireless communicator located in a first direction according to a predetermined priority.

The displaying may include, based on identification that the signal is not received via the wireless communicator located in the first direction, displaying the image based on a signal received via a wireless communicator located in a second direction according to the predetermined priority.

The method may include generating information related to a transmission error of the wireless communicator located in the first direction, and displaying the generated information through at least one cabinet.

The plurality of wireless communicators may be provided at positions where the first cabinet is coupled to the adjacent cabinets.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 9 and 10 are views illustrating a method for setting identification information of each cabinet according to an embodiment;

DETAILED DESCRIPTION

The terms used in the specification and the claims are general terms selected in consideration of the functions of the various embodiments of the disclosure. However, these terms may vary depending on intention, legal or technical interpretation, emergence of new technologies, and the like of those skilled in the related art. Further, some of the terms may be ones arbitrarily selected by the applicant. Unless there is a specific definition of a term, the term may be construed based on the overall contents and technological common sense of those skilled in the related art.

In describing embodiments, detailed description of relevant known functions or components may be omitted if it would obscure the description of the subject matter.

Embodiments of the disclosure will be described in detail with reference to the accompanying drawings, but the features of the disclosure are not limited thereto.

Figure 1A:
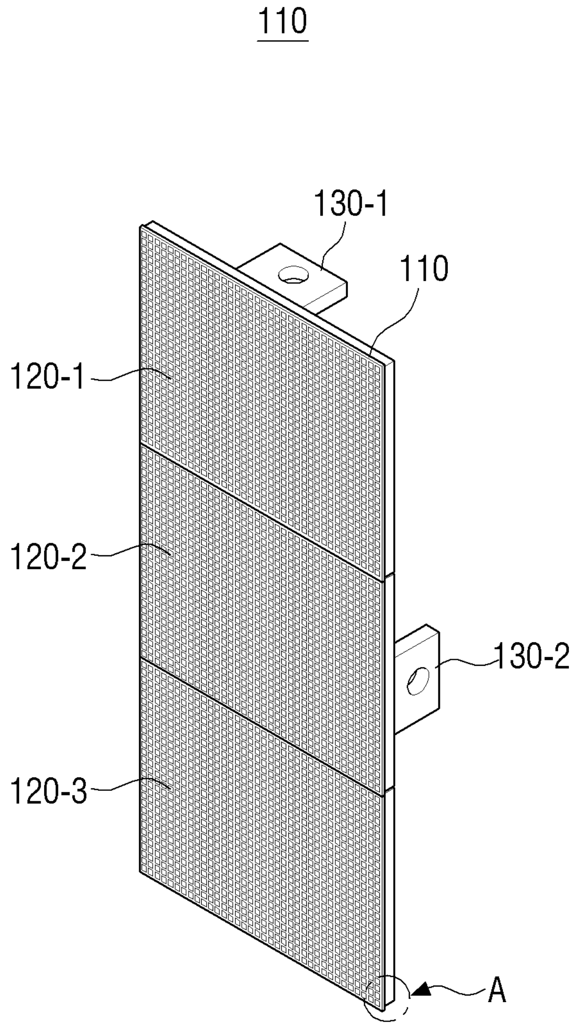
FIGS. 1A, 1B, and 1C are views illustrating a cabinet according to an embodiment.
Figure 1B:
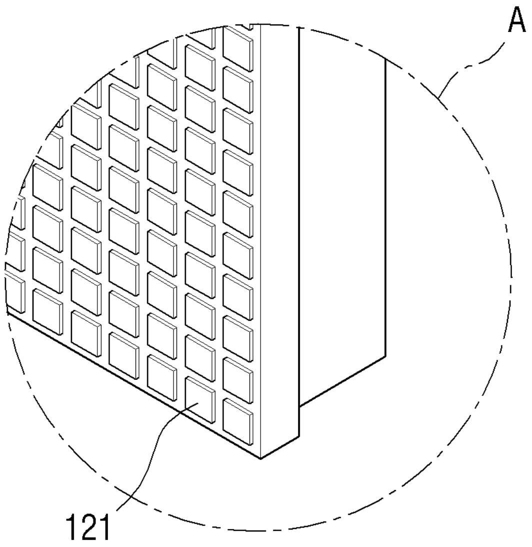
Figure 1C:
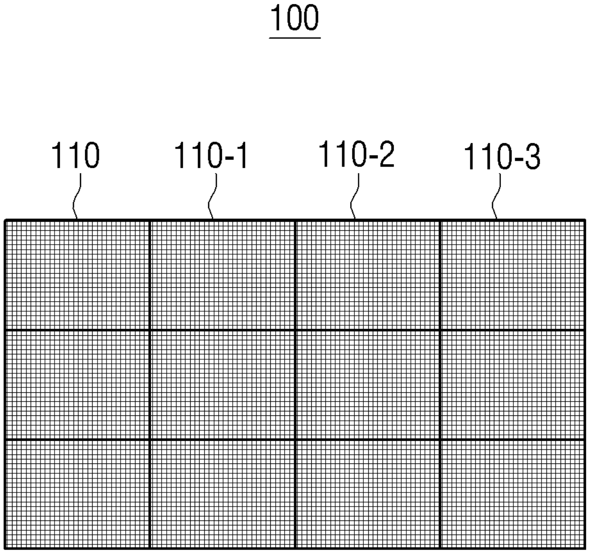

FIGS. 1A, 1B, and 1C are views illustrating a cabinet according to an embodiment.

A cabinet 110 according to an embodiment may include at least one display module.

For example, referring to FIG. 1A, the cabinet 110 according to an embodiment may include three display modules 120-1, 120-2, and 120-3. Each of three display modules 120-1, 120-2 and 120-3 may be physically connected one another.

Each of the display modules 120-1, 120-2, and 120-3 may be embodied as an LED display module including a light emitting diode (LED).

To be specific, referring to FIG. 1B, each of the display modules 120-1, 120-2, and 120-3 may be embodied as an LED display module including a plurality of LEDs 121, each of which realizes sub-pixels, i.e., red LED, green LED, and blue LED as one pixel.

The plurality of pixels may be arranged in a matrix arrangement (e.g., M×N, M and N are natural numbers). To be specific, the matrix arrangement (e.g., M×N, M and N are natural numbers, 16×16 arrangement, 24×24 arrangement, etc.), may have the same arrangement in addition to a different arrangement (e.g., M #N, M and N are natural numbers).

An LED of the LED display module according to an embodiment may be embodied with a micro LED. The micro LED may be an LED of approximately 5~100 micro size, and may refer to a micro size light emitting element that emits light itself without a color filter.

However, embodiments are not limited thereto, and the LED display module may be implemented as an organic LED (OLED), an active matrix OLED (AMOLED), a Plasma Display Panel (PDP) or the like. Hereinafter, for convenience of explanation, it is assumed that the display module according to an embodiment of the disclosure is an LED display module.

Referring to FIG. 1A, the cabinet 110 according to an embodiment may be embodied in 1×3 arrangement including the plurality of display modules 120-1, 120-2, and 120-3.

However, the LED display module in the arrangement of 1×3 is only an embodiment, but the arrangement and number of the LED display modules may vary.

The cabinet 110 may include a base plate for mounting each of the display modules 120-1, 120-2, and 120-3. The base plate may be embodied such that each display module may be attached to a front surface of the base plate. Accordingly, the cabinet 110 according to an embodiment may be embodied as being bezel-less, and in the case of a modular display apparatus with a plurality of cabinets combined, a seamless image between cabinets may be displayed in displaying an image.

The cabinet 110 according to an embodiment may include a plurality of engaging units 130-1 and 130-2 that can be engaged with another cabinet. Therefore, the cabinet 110 according to an embodiment may be embodied as a modular display apparatus by being engaged with another cabinet.

For example, referring to FIG. 1C, the cabinet 110 according to an embodiment may be combined with a plurality of other cabinets 110-1, 110-2, and 110-3 in the arrangement of 4×1 to realize a modular display apparatus 100 such as a video wall. The modular display apparatus in the arrangement of 4×1 is only an example, but the arrangement and the number of cabinets may vary.

Figure 2:
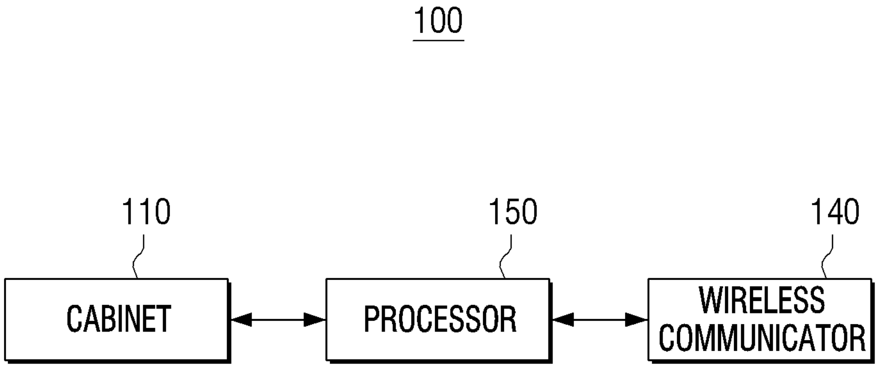
FIG. 2 is a block diagram illustrating a display apparatus according to an embodiment.

FIG. 2 is a block diagram illustrating a display apparatus according to an embodiment.

Referring to FIG. 2, a display apparatus 100 according to an embodiment may include a cabinet 110, a wireless communicator 140, and a processor 150.

For ease of explanation, the description will be made with reference to FIG. 3 to FIG. 5.

The cabinet 110 may include at least one display module. For example, the cabinet 110 may include a plurality of display modules connected in the arrangement of 1×3. However, embodiments are not limited thereto, and the arrangement and the number of display modules may vary.

The cabinet 110 may be engaged with other cabinets. For example, the cabinet 110 may be engaged with a plurality of other cabinets in the arrangement of 4×1.

Accordingly, the cabinet 110 according to an embodiment may be embodied as a modular display apparatus 100 such as a video wall by being engaged with other cabinets.

However, the engagement arrangement of the cabinets is not limited thereto, but could vary. That is, a plurality of cabinets may be disposed to be adjacent to each other and embodied in various forms to constitute a screen of the display apparatus 100.

The wireless communicator 140 may be provided in each cabinet. To be specific, the wireless communicator 140 may be provided on different sides of the cabinet 110.

Figure 3:
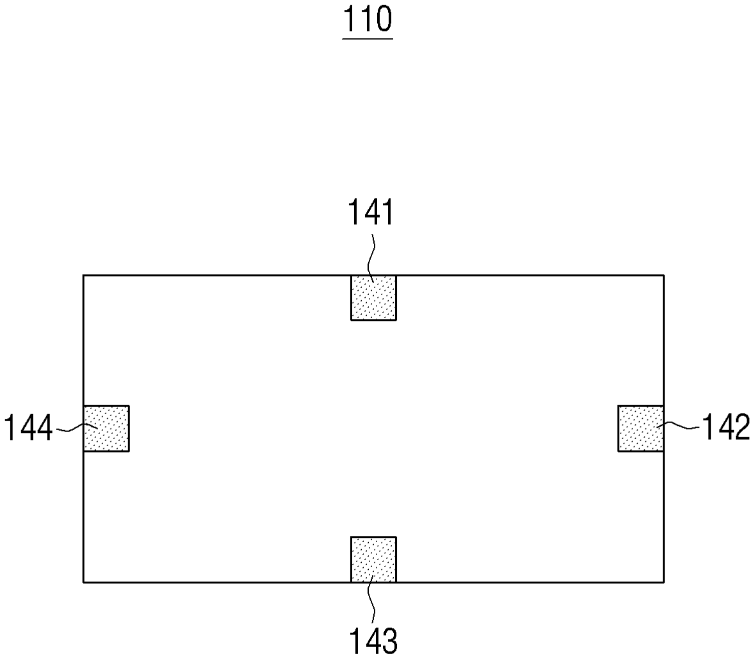
FIG. 3 is a view illustrating a wireless communicator according to an embodiment.

For example, referring to FIG. 3, the wireless communicator 140 may include a first wireless communicator 141 provided on the upper side of the cabinet 110, a second wireless communicator 142 provided on the right side of the cabinet 110, a third wireless communicator 143 provided at the bottom of the cabinet 110, and a fourth wireless communicator 144 provided on the left side of the cabinet 110. 150

The wireless communicator 140 may transmit various signals to another cabinet adjacent thereto. The wireless communicator 140 may transmit image signals and control signals to another cabinet adjacent thereto.

The first wireless communicator 141 may transmit a signal to another cabinet combined with the upper side of the cabinet 110, and the second wireless communicator 142 may transmit a signal to another cabinet combined with the right side of the cabinet 110. The third wireless communicator 144 may transmit a signal to another cabinet combined with the lower side of the cabinet 110, and the fourth wireless communicator 144 may transmit a signal to another cabinet combined with the left side of the cabinet 110.

The wireless communicator 140 may be provided in a position to transmit a signal to a cabinet adjacent thereto. The wireless communicator 140 may be provided in a position where a plurality of cabinets are combined with one another.

Figure 4:
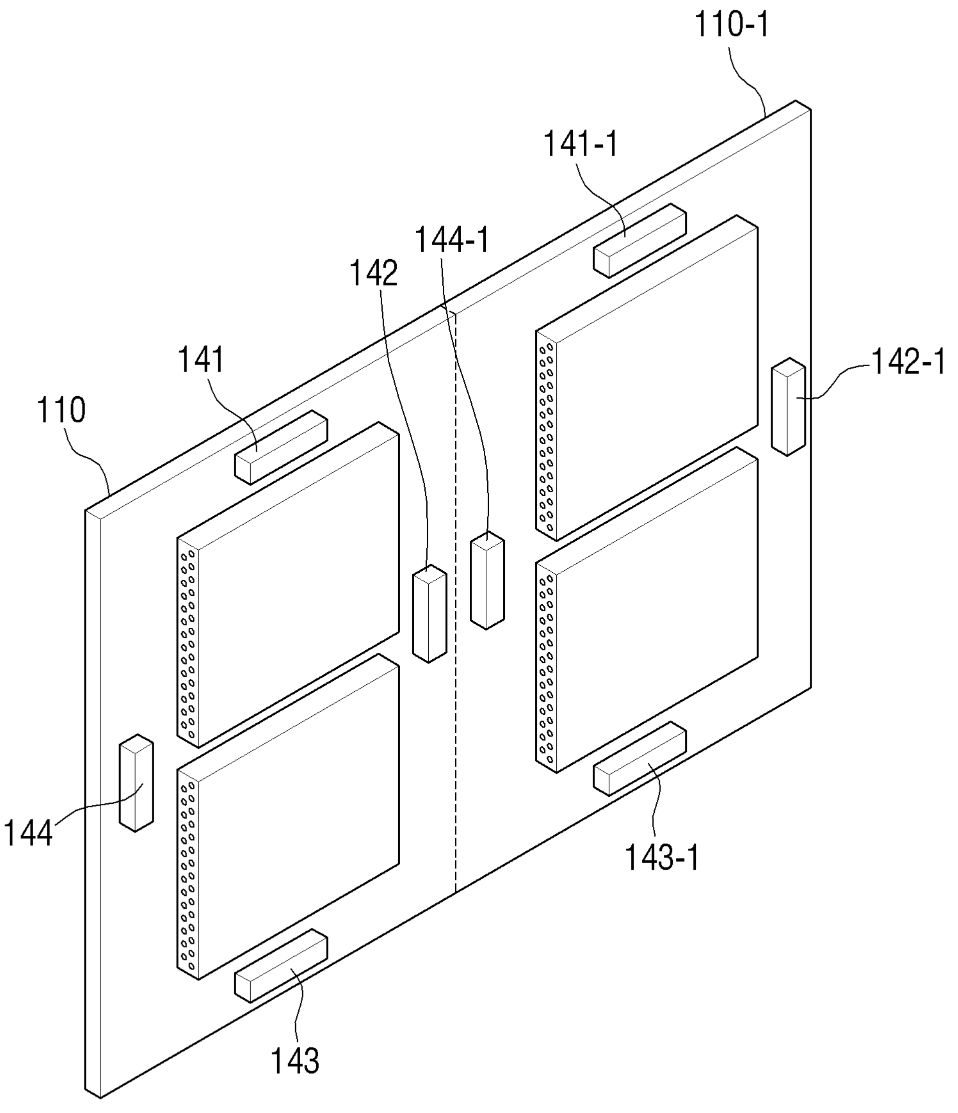
FIG. 4 is a view illustrating an arrangement structure of a wireless communicator according to an embodiment.

Specifically, referring to FIG. 4, the second wireless communicator 142 provided on the right side of the cabinet 110 may be provided in a positon that transmits and receives a signal to and from the first wireless communicator 144-1 of another cabinet 110-1 combined with the cabinet 110. In the similar manner, the first, third, and fourth wireless communicators 141, 143, and 144 of the cabinet 110 may be provided in a position that transmits and receives a signal to and from a wireless communicator of the another cabinet combined with the cabinet 110 (e.g., wireless communicators 141-1, 142-1, 143-1, and 144-1).

However, the arrangement as shown in FIG. 4 is only an example, which means that the arrangement of the wireless communicator 140 is not limited thereto.

The wireless communicator 140 may transmit power to another adjacent cabinet. The wireless communicator 140 may transmit power in a predetermined direction.

The predetermined direction may be a direction passing through a plurality of cabinets included in the display apparatus 100. The detailed description thereof will made below.

The processor 150 may control the overall operation of the modular display apparatus 100. The processor 150 may include one or more of a central processing unit (CPU), an application processor (AP), or a communication processor (CP). The processor 150 may be included in each cabinets 110, 110-1, 110-2, 110-3, and so on.

When the cabinet 110 receives a signal, the processor 150 may control the wireless communicator 140 to transmit the signal to each of a plurality of cabinets combined the cabinet 110 at which the signal is received.

The processor 150, when a specific cabinet, among a plurality of cabinets, receives a signal from at least one adjacent cabinet via at least one wireless communicator provided in the specific cabinet, may transmit the signal to a plurality of cabinets adjacent to the specific cabinet via a plurality of wireless communicators provided in the specific cabinet.

The signal may be a signal received from an external device or a signal for the image stored in a storage. The external device may be various electronic apparatuses connected to the module display apparatus 100 such as a server, a set-top box, a USB storage, a PC, a smartphone, etc.

Figure 5:
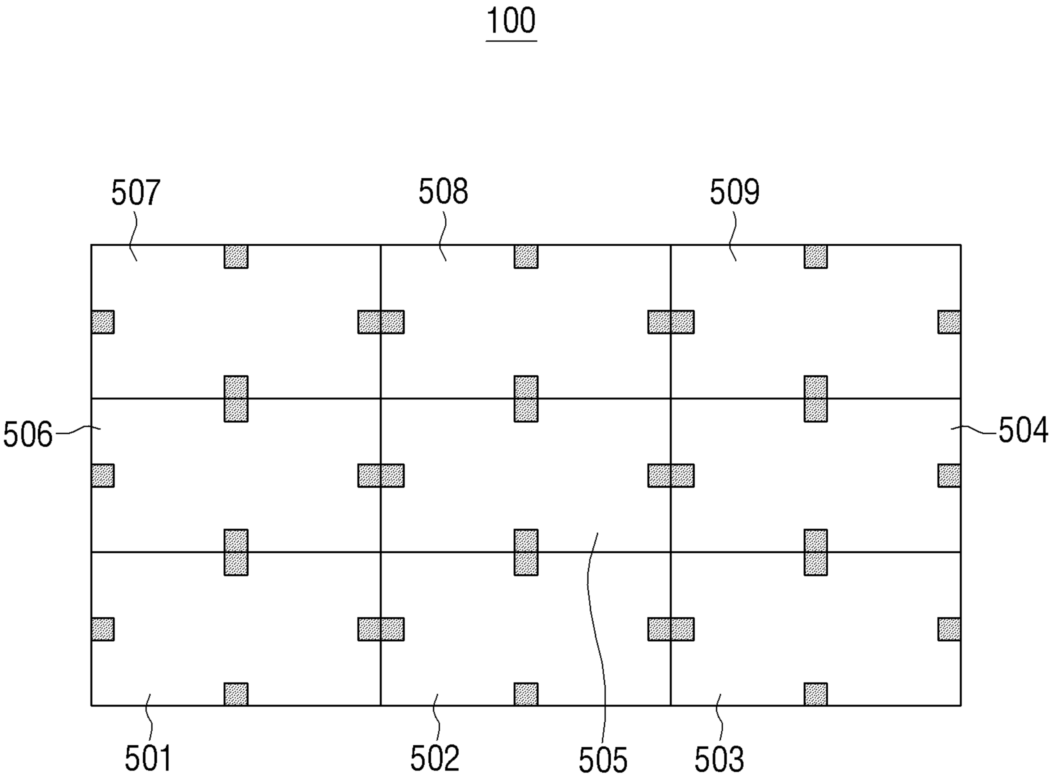
FIG. 5 is a view illustrating a display apparatus combined in a 3×3 arrangement according to an embodiment.

For example, referring to FIG. 5, it is exemplified that first to ninth cabinets 501, 502, 503, 504, 505, 506, 507, 508, and 509 are combined in the arrangement of 3×3.

Referring to FIG. 5, the first cabinet 501 may receive a signal from the external device.

The processor 150 may transmit a signal to each of the second cabinet 502 and the sixth cabinet 506 combined with the first cabinet 501 via a plurality of wireless communicators provided in the first cabinet 501.

The processor 150 may transmit the signal transmitted to the second cabinet 502 to each of the first, third, and fifth cabinets 501, 503 and 505 combined with the second cabinet 502, and transmit the signal transmitted to the sixth cabinet 506 to each of the first, fifth, and seventh cabinets 501, 505, and 507 combined with the sixth cabinet 506.

In the similar manner, the processor 150 may transmit the signal transmitted to the third cabinet 503 to each of the second and fourth cabinets 502 and 504 combined with the third cabinet 503, the signal transmitted to the fifth cabinet 505 to each of the second, fourth, sixth and eighth cabinets 502, 504, 506, and 508, and the signal transmitted to the seventh cabinet 507 to each of the sixth and eighth cabinets 506 and 508 combined with the seventh cabinet 507.

The processor 150 may transmit the signal transmitted to the fourth cabinet 504 to the fifth and ninth cabinets 505 and 509 combined with the fourth cabinet 504, and the signal transmitted to the eighth cabinet 508 to each of fifth, seventh, and ninth cabinets 505, 507, and 509 combined with the eighth cabinet 508.

When the signal is received at a plurality of cabinets constituting the screen of the display apparatus 100, the processor 150 may display an image corresponding to each cabinet through each cabinet based on the signal.

The processor 150 may divide an image frame included in the signal into a plurality of image frames based on identification information of each cabinet, and control each cabinet to display each divided frame.

For example, referring to FIG. 5, when the signal is transmitted to each of the first, second, third, fourth, fifth, sixth, seventh, eighth, and ninth cabinets 501, 502, 503, 504, 505, 506, 507, 508, and 509, the processor 150 may divide the image frame included in the signal into nine sub-frames based on identification information of each of the first, second, third, fourth, fifth, sixth, seventh, eighth, and ninth cabinets 501, 502, 503, 504, 505, 506, 507, 508, and 509. The description on the identification information will be described below.

The processor 150 may display the divided image frame through each cabinet corresponding to identification information.

By transmitting the signal received at a specific signal to each of a plurality of cabinets, the display apparatus 100 according to an embodiment may provide an image through an entire screen even if a signal transmission error occurs in any one of cabinets.

For example, referring to FIG. 5, even if a signal transmission error occurs between the fourth and fifth cabinets 504, and 505, and the fifth cabinet 505 fails to receive a signal from the fourth cabinet 504, the fifth cabinet 505 may provide an image using the signals received from the second, sixth, and eighth cabinets 502, 506, and 508.

Figure 6:
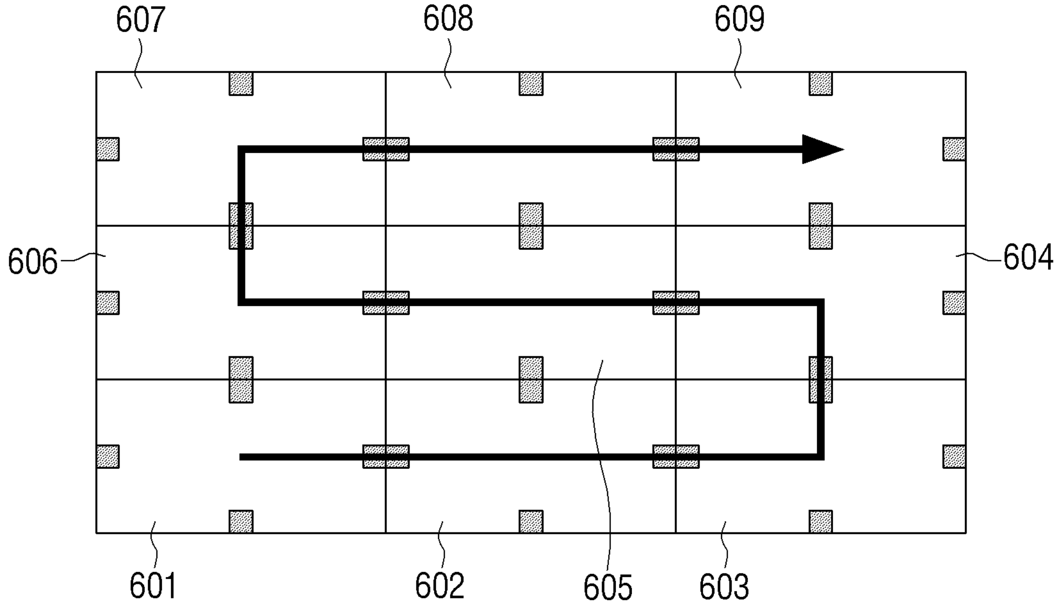
FIG. 6 is a view illustrating a method for signal processing of a display apparatus according to an embodiment.

FIG. 6 is a view illustrating a method for signal processing of a display apparatus according to an embodiment.

As described above, the cabinet 110 may transmit a signal to another adjacent cabinet via a plurality of wireless communicators provided in the cabinet 110. The specific cabinet of the display apparatus may receive a plurality of signals from another adjacent cabinet via a plurality of wireless communicators.

For example, referring to FIG. 6, when first, second, third, fourth, fifth, sixth, seventh, eighth and ninth cabinets 601, 602, 603, 604, 605, 606, 607, 608, and 609 are combined in the arrangement of 3×3, the fifth cabinet 605 may receive a signal from each of the second, fourth, sixth and eighth cabinets 602, 604, 606, and 608.

The processor 150 may provide an image based on the signal received via a wireless communicator disposed in a first direction according to a predetermined priority.

The predetermined priority may be determined variously depending on a user command. For example, referring to FIG. 6, the priority of each wireless communicator that transmits a signal to each of the first, second, third, . . . , and eighth, and ninth cabinets may be set to be higher than the priority of another wireless communicator.

The processor 150 may provide an image based on the signal received from the fourth cabinet 604 among the signals transmitted from the second, fourth, sixth, and eighth cabinets 602, 604, 606, and 608 to the fifth cabinet 605.

Although a single cabinet receives a plurality of signals, a single signal may be processed by a predetermined priority, and thus a modular display apparatus according to an embodiment may reduce the load of the processor.

The processor 150, when it is identified that no signal is received via the wireless communicator in the first direction, may provide an image based on the signal received via the wireless communicator provided in a second direction according to the predetermined priority.

The processor 150, when it is identified that no signal is received via a wireless communicator having higher priority, may provide the image through the signal received via a wireless communicator in a following priority.

Accordingly, the modular display apparatus 100 according to an embodiment may provide an image through an entire screen even if a signal transmission error occurs in any one of the cabinets.

The processor 150, when it is identified that no signal is received via the wireless communicator disposed in the first direction, may generate information on the transmission error of the wireless communicator disposed in the first direction, and provide the generated information through at least one cabinet.

Figure 7:
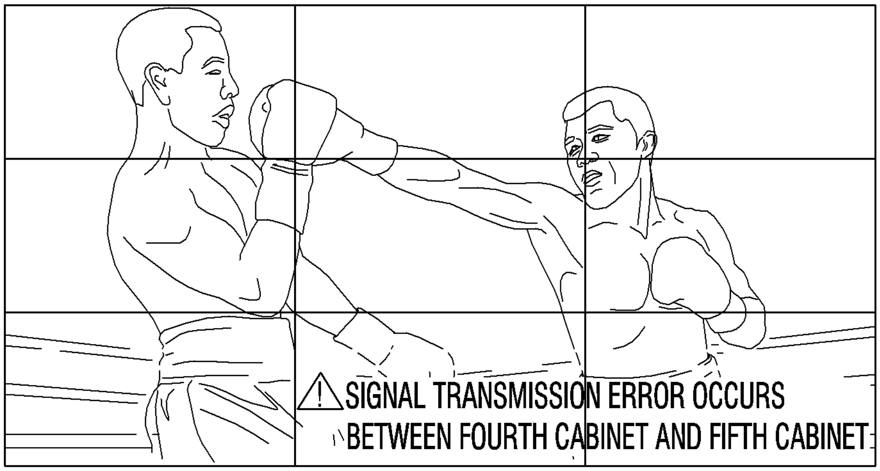
FIG. 7 is a view illustrating an embodiment for displaying a transmission error message by a display apparatus according to an embodiment.

For example, when it is identified that no signal transmission is performed between the fourth and fifth cabinets 404, and 405, the processor 150 may display a message that the signal transmission error occurs between the fourth cabinet and the fifth cabinet on one area of the display apparatus 100 as shown in FIG. 7.

As shown in FIG. 7, even if the signal transmission error occurs in the fifth cabinet 605, the fifth cabinet 605 may provide an image based on the signal received from each of the second, sixth and eighth cabinets 602, 606, and 608 other than the fourth cabinet 604. Therefore, the display apparatus 100 may provide an image through an entire screen.

Figure 8:
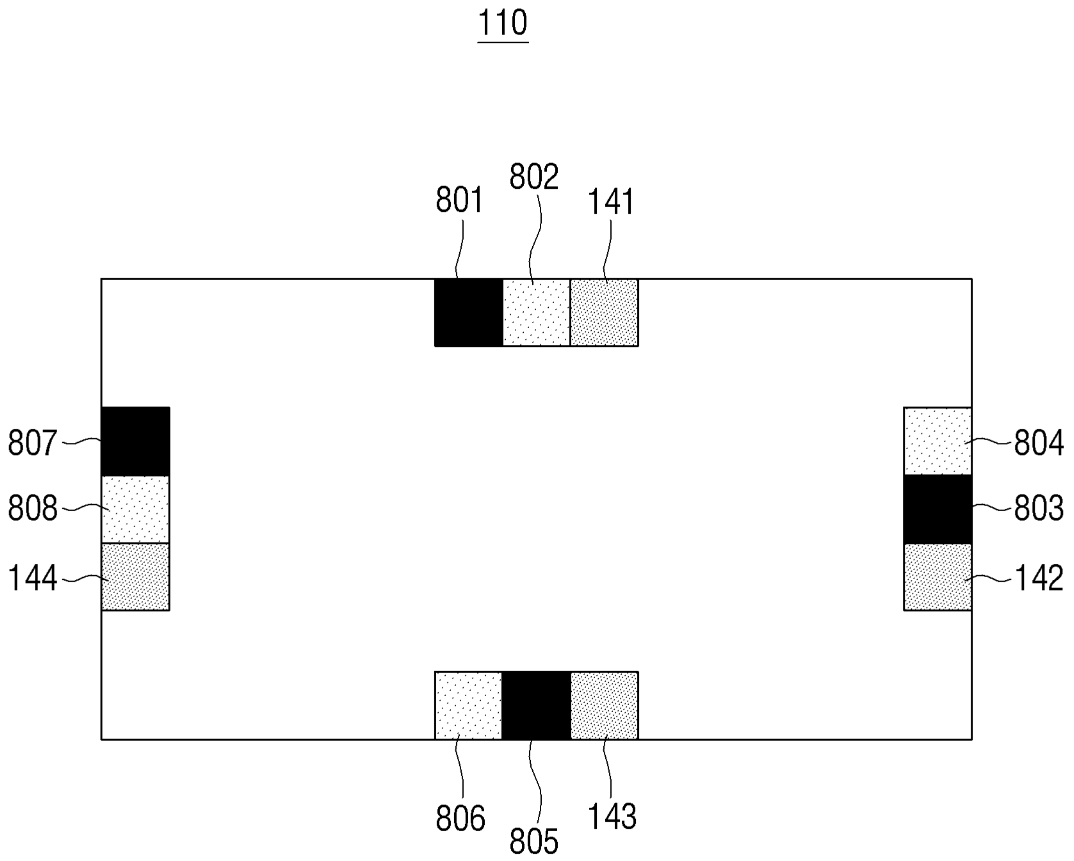
FIG. 8 is a view illustrating a sensor of a cabinet according to an embodiment.

FIG. 8 is a view illustrating a sensor of a cabinet according to an embodiment.

The cabinet 110 according to an embodiment may include a sensor that detects an adjacent cabinet. The sensor may be a magnetic sensor as well as various sensors capable of detecting an adjacent cabinet such as an infrared sensor.

FIG. 8 is a view illustrating an example embodiment in which a sensor is a magnetic sensor.

A magnetic body and a magnetic sensor for sensing the magnetic body may be provided on different sides of the cabinet 110, respectively.

Referring to FIG. 8, a first magnetic body 801 and a first sensor 802 may be provided on the upper side of the cabinet 110, and a second magnetic body 803 and a second sensor 804 may be provided on the right side of the cabinet 110. A third magnetic body 805 and a third sensor 806 may be provided on the lower side of the cabinet 110, and a fourth magnetic body 807 and a fourth sensor 808 may be provided on the left side of the cabinet 110.

Figure 9:
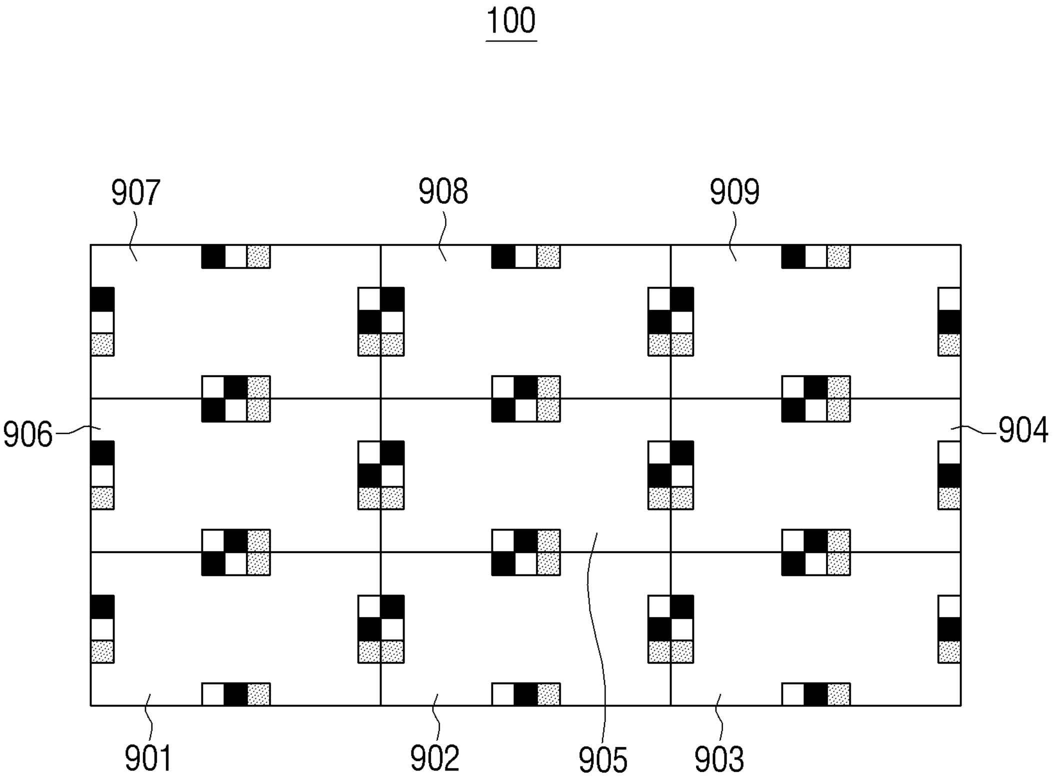

FIG. 9 and FIG. 10 are views illustrating a method for setting identification information of each cabinet according to an embodiment.

Referring to FIG. 9, the first, second, third, fourth, fifth, sixth, seventh, eighth and ninth cabinets 901, 902, 903, 904, 905, 906, 907, 908, and 909 may be combined in the arrangement of 3×3.

One of a plurality of cabinets may be supplied with power from an external source. For example, a cabinet 901 disposed at the left bottom may be supplied with power from the external source.

The processor 150 may sent identification information of a cabinet supplied with power from the external source to a first value. The processor 150 may set identification information of the cabinet 901 disposed at the left bottom to a first identification value.

The processor 150 may identify a cabinet to which power is supplied among a plurality of cabinets adjacent to the cabinet of the first identification value based on the sensing result of the plurality of sensors provided in the cabinet of the first identification value.

The processor 150 may identify a cabinet to which power is supplied based on a pre-stored look-up table. The detailed description thereof will be made with reference to FIG. 10.

The processor 150 may supply power to the identified cabinet, and set the identification information of the cabinet to which power is supplied to a second identification value.

In the similar manner, the processor 150 may identify a cabinet to which power is supplied based on the sensing result of the sensor provided in the cabinet of the second identification cabinet, supply power to the identified cabinet, and set the identification information of the cabinet to which the power is supplied to a third identification value.

The processor 150 may increase the identification values in the order from the cabinet of the first identification value to the cabinet to which power is supplied to set identification information on the plurality of cabinets.

It has been described that power is supplied and then identification information on the cabinet is set, but the order is not limited thereto. For example, the processor 150 may set the second identification value to the cabinet identified as a cabinet to which power is supplied based on the sensing result of the sensor provided in the cabinet of the first identification cabinet, and supply power to the cabinet of the second identification value.

FIG. 10 is a view illustrating a method for identifying a cabinet to which power is supplied among a plurality of cabinets adjacent to a cabinet based on a sensing result of a sensor according to an embodiment.

The processor 150, when a specific cabinet among a plurality of cabinets receives power from an external source, may identify a cabinet to which power is supplied from among a plurality of cabinets adjacent to the specific cabinet based on the sensing result of the sensor provided in the specific cabinet.

In the similar manner, the processor 150, when a specific cabinet among a plurality of cabinets receives power from an adjacent cabinet, may identify a cabinet to which power is supplied from among the plurality of cabinets adjacent to the specific cabinet based on the sensing result of the sensor provided in the specific cabinet.

The processor 150 may identify a cabinet to which power is supplied according to a look-up table shown in FIG. 10.

Referring to FIG. 10, when an adjacent cabinet is sensed by the first sensor provided on the upper side, and the second sensor provided on the right side among a plurality of sensors provided in the cabinet 110, the processor 150 may identify the cabinet adjacent to the right side as a cabinet to which power is supplied thorough the second wireless communicator 142.

The processor 150, when the adjacent sensor is sensed by the first sensor provided on the upper side, the second sensor provided on the right side, and the fourth sensor provided on the left side among the plurality of sensors provided in the cabinet 110, may identify a cabinet adjacent to the right side as a cabinet to which power is supplied via the second wireless communicator 112.

The processor 150, when an adjacent sensor is sensed by the first sensor provided on the upper side, and the fourth sensor provided on the left side among the plurality of sensors provided in the cabinet 110, may identify a cabinet adjacent to the upper side as a cabinet to which power is supplied via the first wireless communicator 111.

The processor 150, when an adjacent sensor is sensed by the first sensor provided on the upper side, the third sensor provided on the lower side, and the fourth sensor provided on the left side among the plurality of sensors provided in the cabinet 110, may identify a cabinet adjacent to the upper side as a cabinet to which power is supplied via the first wireless communicator 111, or a cabinet adjacent to the left side as a cabinet to which power is supplied via the fourth wireless communicator 144.

The processor 150 may determine one of the first and fourth wireless communicators based on the wireless communicator that receives power. The processor 150, when power is received via the fourth wireless communicator 144, may identify a cabinet adjacent to the upper side as a cabinet to which power is supplied via the first wireless communicator 111, and when power is received via the third wireless communicator 143, may identify a cabinet adjacent to the left side as a cabinet to which power is supplied via the fourth wireless communicator 144.

In the same manner, the processor 150 may identify a cabinet to which power is supplied based on the look-up table as shown in FIG. 10. The above-described technical spirit is applied to the look-up table as shown in FIG. 10, and thus the detailed description will be omitted.

The processor 150 may supply power sequentially to the identified cabinet.

Referring to FIG. 9, the processor 150 may set identification information of the cabinet 901 to which power is supplied from the external source to a first value.

When an adjacent cabinet is identified as being sensed through the first and second sensors provided in the cabinet 910 set to be the first identification value, a cabinet 902 adjacent to the right side of the cabinet 901 may be identified as a cabinet to which power is supplied.

The processor 150 may supply power to the cabinet 902 via the second wireless communicator 142 provided in the cabinet 901, and set the identification information of the cabinet 902 to which power is supplied as the second identification value.

In the similar manner, the processor 150 may identify a cabinet to which power is supplied based on the sensing result of the sensor provided in the cabinet 902 of the second identification value, supply power to the identified cabinet, and set the identification information on the cabinet to which power is supplied to a third identification value.

The processor 150 may set identification information on a plurality of cabinets by sequentially increasing the identification values in the order from the cabinet of the first identification value to the cabinet to which power is supplied.

Therefore, the identification information of each cabinet may be automatically set.

Figure 11:
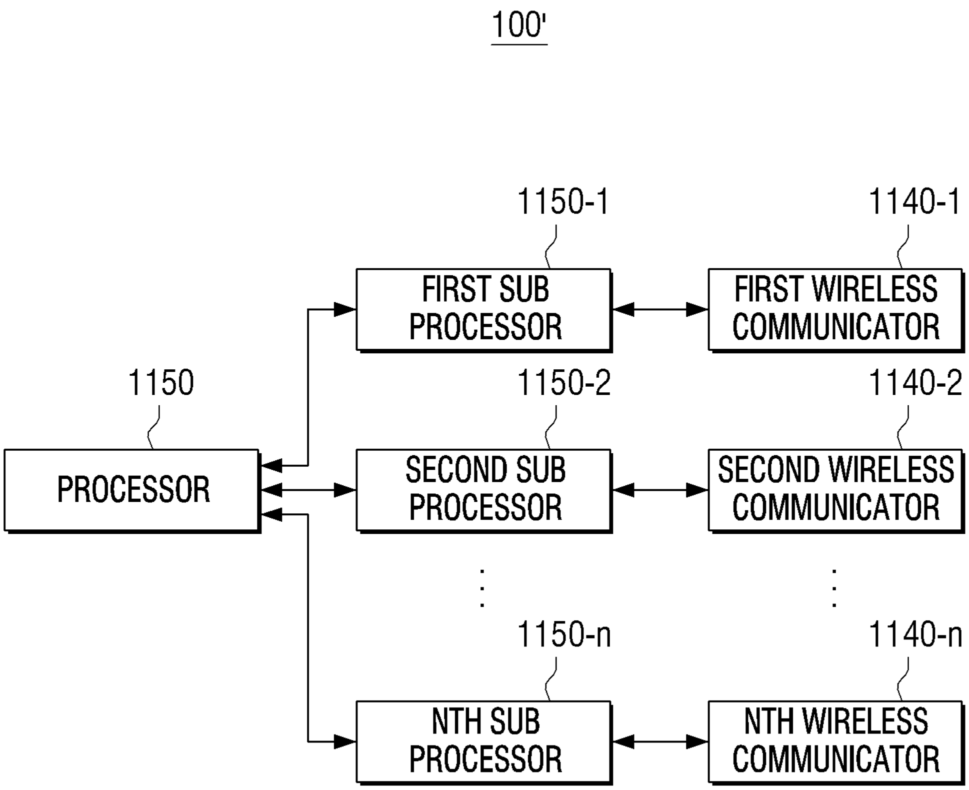
FIG. 11 is a flowchart illustrating a method for controlling a display apparatus according to an embodiment.

FIG. 11 is a block diagram illustrating a display apparatus according to an embodiment.

Referring to FIG. 11, a display apparatus 100' according to an embodiment of the disclosure may include first to nth sub-processors 1150-1 to 1150-*n*, first to nth wireless communicators 1140-1 to 1140-*n*, and a processor 1150.

The first to nth sub-processors 1150-1 to 1150-*n* and the first to nth wireless communicators 1140-1 to 1140-*n* may be included in the first to nth cabinets, respectively.

For example, the first sub-processor 1150-1 and the first wireless communicator 1140-1 may be included in the first cabinet. The first wireless communicator 1140-1 may be provided on the upper side, the lower side, the left side, and the right side of the first cabinet.

The second sub-processor 1150-2 and the second wireless communicator 1140-2 may be included in the second cabinet. The second wireless communicator 1140-2 may be provided on the upper side, the lower side, the left side, and the right side of the second cabinet.

Similarly, the nth sub-processor 1150-*n* and the nth wireless communicator 1140-*n* may be included in the nth cabinet.

The processor 1150 may control the overall operation of the display apparatus 100'.

The processor 1150, when a signal is received at a specific cabinet, may transmit a signal to each of a plurality of cabinets combined with the specific cabinet that receives the signal.

When the signal is received at the first cabinet, the processor 1150 may control the first sub-processor 1150-1 to transmit the signal to each of the plurality of cabinets combined with the first cabinet.

The first sub-processor 1150-1 may control the first wireless communicator 1140-1 to transmit the received signal to each of the plurality of cabinets combined with the first cabinet.

When the signal is received at the second cabinet, the processor 1150 may control the second sub-processor 1150-2 to transmit the signal to each of the plurality of cabinets combined with the second cabinet.

The second sub-processor 1150-2 may control the second wireless communicator 1140-2 to transmit the received signal to each of the plurality of cabinets combined with the second cabinet.

In the similar manner, the processor 1150, when the signal is received at the nth cabinet, may control the nth sub-processor 1150-*n* to transmit the signal to each of the plurality of cabinets combined with the nth cabinet.

The nth sub-processor 1150-*n* may control the nth wireless communicator 1140-*n* to transmit the received signal to each of the plurality of cabinets combined with the nth cabinet.

In the similar manner, when the signal is received at the plurality of cabinets constituting the screen of the display apparatus 100', the processor 1150 may display an image corresponding to each cabinet through each cabinet based on the received signal.

To be specific, the processor 1150, when the signal is received at the plurality of cabinets, may control each sub-processor to divide an image frame included in the signal based on identification information of each cabinet.

For example, when the signal is received at the plurality of cabinets, the processor 1150 may control the first sub-processor 1150-1 to divide the image frame included in the signal based on the identification information of the first cabinet, and the second sub-processor 1150-2 to divide the image frame included in the signal based on the identification information of the second cabinet.

In the similar manner, the processor 1150 may control the nth sub-processor 1150-*n* to divide the image frame included in the signal based on the identification information on the nth cabinet.

Each sub-processor may divide the image frame included in the signal based on the identification information of each cabinet, and display the divided image frame through each cabinet.

Figure 12:
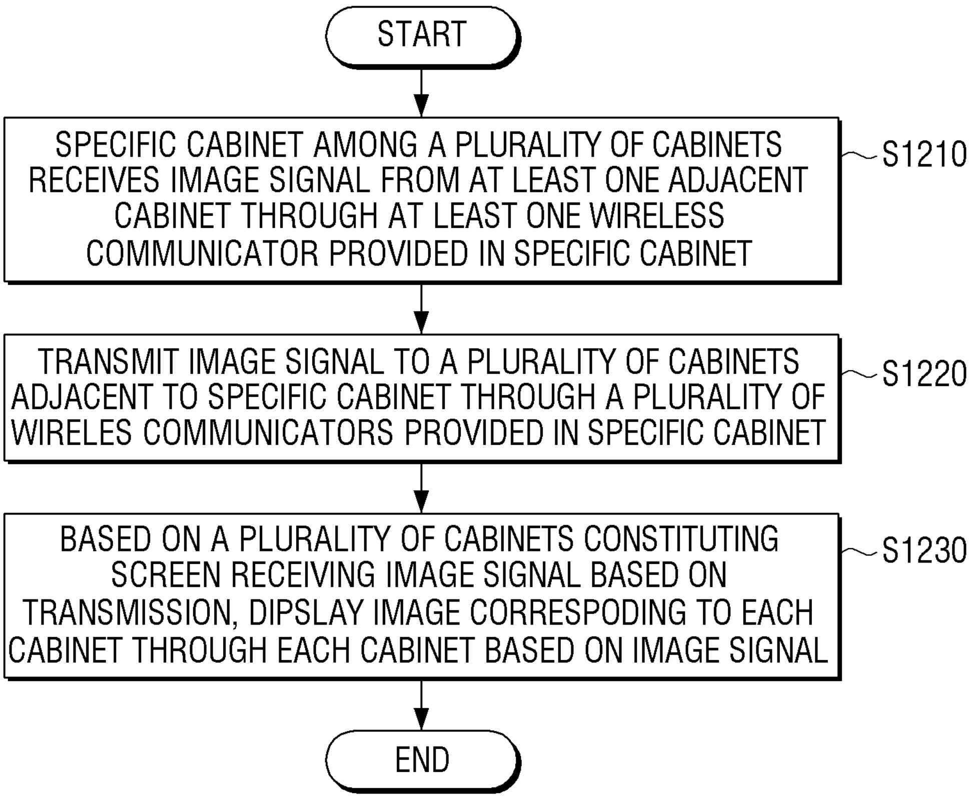
FIG. 12 is a flow chart illustrating a method for controlling a display apparatus according to an embodiment.

FIG. 12 is a flow chart illustrating a method for controlling a display apparatus according to an embodiment.

A display apparatus according to an embodiment may include a plurality of cabinets constituting a screen of a display apparatus disposed adjacent to one another.

A specific cabinet (e.g., first cabinet) among a plurality of cabinets of the display apparatus may receive a signal from at least one adjacent cabinet via at least one wireless communicator provided in the specific cabinet at step S1210.

The specific cabinet that receives the signal may transmit the signal to a plurality of cabinets adjacent to the specific cabinet via a plurality of wireless communicators provided in the specific cabinet at step S1220.

When a plurality of cabinets constituting a screen of the display apparatus receives the signal, the display apparatus may display an image corresponding to each cabinet through each cabinet based on the signal at step S1230.

The display apparatus 100 according to an embodiment may transmit the signal received at a specific cabinet to each of a plurality of cabinets to thereby provide an image through an entire screen despite the signal transmission error occurrence of any one of cabinets.

According to another embodiment, a non-transitory computer readable medium may be provided in which a program for sequentially executing a control method of an electronic apparatus according to the disclosure is stored.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

According to an aspect of one or more embodiments, a modular display apparatus provides an image through an entire screen even if a signal transmission error occurs in any one display apparatus.

Although embodiments have been shown and described, it will be appreciated by those skilled in the art that changes may be made to these embodiments without departing from the principles and spirit of the disclosure. Accordingly, the scope of the disclosure is not limited to the described embodiments, but is defined by the appended claims as well as equivalents thereto.

What is claimed is:

1. A display module of a plurality of display modules included in a display apparatus, the display module comprising:

a wireless communicator;

a plurality of sensors configured to sense at least one display module adjacent to the display module;

one or more processors;

wherein the one or more processors are configured to:

receive a power from an external source, obtain a sensing result from at least one sensor among the plurality of sensors, identify a target display module among the at least one display module adjacent to the display module based on a mapping between one or more locations at which the sensing result is received and a direction in which power is to be provided for the target display module, and provide the power to the target display module through the wireless communicator.

2. The display module according to claim 1, further comprising:

a memory configured to store a look-up table for indicating the mapping, wherein the one or more processors are configured to:

identify at least one target sensor that identifies another display module adjacent to the display module based on the sensing result, identify identification information of the at least one target sensor, and identify the target display module corresponding to the identification information based on the look-up table.

3. The display module according to claim 1, wherein the wireless communicator includes a plurality of wireless communicators, and wherein the one or more processors are further configured to:

identify a target wireless communicator adjacent to the target display module among the plurality of wireless communicators.

4. The display module according to claim 1, wherein a number of the plurality of sensors is same as a number of the plurality of wireless communicators.

5. The display module according to claim 1, wherein each of the plurality of sensors is disposed at each position adjacent to each of the plurality of wireless communicators.

6. The display module according to claim 1, wherein the plurality of sensors include a first sensor, a second sensor, a third sensor and a fourth sensor, wherein the first sensor is disposed at an upper side of the display module, wherein the second sensor is disposed at a right side of the display module, wherein the third sensor is disposed at a lower side of the display module, and wherein the fourth sensor is disposed at a left side of the display module.

7. The display module according to claim 6, wherein the one or more processors are further configured to:

based on at least one adjacent display module being sensed by the first sensor and the second sensor, provide the power to a display module adjacent to a first direction as the target display module, and based on at least one adjacent display module being sensed by the first sensor, the second sensor and the fourth sensor, provide the power to a display module adjacent to the first direction as the target display module.

8. The display module according to claim 7, wherein the one or more processors are further configured to:

based on at least one adjacent display module being sensed by the first sensor and the fourth sensor, provide the power to a display module adjacent to a second direction as the target display module.

9. The display module according to claim 8, wherein the one or more processors are further configured to:

based on at least one adjacent display module being sensed by the first sensor, the third sensor and the fourth sensor, provide the power to a display module adjacent to a third direction as the target display module, and based on at least one adjacent display module being sensed by the first sensor, the second sensor, the third sensor and the fourth sensor, provide the power to a display module adjacent to the third direction as the target display module.

10. The display module according to claim 9, wherein the one or more processors are further configured to:

based on at least one adjacent display module being sensed by the first sensor, the second sensor and the third sensor, provide the power to a display module adjacent to the second direction as the target display module.

11. The display module according to claim 10, wherein the one or more processors are further configured to:

based on at least one adjacent display module being sensed by the second sensor and the third sensor, provide the power to a display module adjacent to the first direction as the target display module, and based on at least one adjacent display module being sensed by the second sensor, the third sensor and the fourth sensor, provide the power to a display module adjacent to the first direction as the target display module.

12. The display module according to claim 11, wherein the one or more processors are further configured to:

based on at least one adjacent display module being sensed by the third sensor and the fourth sensor, do not provide the power to an adjacent display module.

13. The display module according to claim 12, wherein the second direction is perpendicular to the first direction, and wherein the third direction is opposite to the first direction.

14. The display module according to claim 12, wherein the first direction is a right direction, wherein the second direction is an upper direction, and wherein the third direction is a left direction.

15. A method of controlling a display module of a plurality of display modules included in a display apparatus, wherein the display module includes a wireless communicator, and a plurality of sensors for sensing at least one display module adjacent to the display module, the method comprising:

receiving a power from an external source, obtaining a sensing result from at least one sensor among the plurality of sensors, identifying a target display module among the at least one display module adjacent to the display module based on a mapping between one or more locations at which the sensing result is received and a direction in which power is to be provided for the target display, and providing the power to the target display module through the wireless communicator.

16. The method as claimed in claim 15, wherein the display module further includes a memory storing a look-up table for indicating the mapping, wherein the identifying the target display module comprises:

identifying at least one target sensor that identifies another display module adjacent to the display module based on the sensing result, identifying identification information of the at least one target sensor, and identifying the target display module corresponding to the identification information based on the look-up table.

17. The method as claimed in claim 15, wherein the wireless communicator includes a plurality of wireless communicators, and wherein the method further comprises:

identifying a target wireless communicator adjacent to the target display module among the plurality of wireless communicators.

18. The method as claimed in claim 15, wherein a number of the plurality of sensors is same as a number of the plurality of wireless communicators.

19. The method as claimed in claim 15, wherein each of the plurality of sensors is disposed at each position adjacent to each of the plurality of wireless communicators.

20. The method as claimed in claim 15, wherein the plurality of sensors include a first sensor, a second sensor, a third sensor and a fourth sensor, wherein the first sensor is disposed at an upper side of the display module, wherein the second sensor is disposed at a right side of the display module, wherein the third sensor is disposed at a lower side of the display module, and wherein the fourth sensor is disposed at a left side of the display module.

* * * * *